United States Patent
Saio et al.

(10) Patent No.: US 7,495,542 B2
(45) Date of Patent: Feb. 24, 2009

(54) FILM TEMPERATURE SENSOR AND TEMPERATURE SENSING SUBSTRATE

(75) Inventors: Katsuo Saio, Kanagawa (JP); Akihiro Ohsawa, Kanagawa (JP)

(73) Assignee: Kelk Ltd., Hiratsuka-shi (JP)

( * ) Notice: Subject to any disclaimer, the term of this patent is extended or adjusted under 35 U.S.C. 154(b) by 368 days.

(21) Appl. No.: 11/202,374

(22) Filed: Aug. 12, 2005

(65) Prior Publication Data

US 2006/0034346 A1  Feb. 16, 2006

(30) Foreign Application Priority Data

Aug. 12, 2004 (JP) .............................. 2004-235505

(51) Int. Cl.
*H01C 1/012* (2006.01)
(52) U.S. Cl. ........................................ 338/306; 338/25
(58) Field of Classification Search ................ 338/306, 338/3, 7, 8, 25
See application file for complete search history.

(56) References Cited

U.S. PATENT DOCUMENTS

| | | | | |
|---|---|---|---|---|
| 3,575,053 A | * | 4/1971 | Telinde | 374/172 |
| 4,791,398 A | * | 12/1988 | Sittler et al. | 338/25 |
| 5,202,665 A | * | 4/1993 | Hafele | 338/25 |
| 5,332,991 A | * | 7/1994 | Kojima et al. | 338/25 |
| 5,436,494 A | * | 7/1995 | Moslehi | 257/467 |
| 6,437,681 B1 | * | 8/2002 | Wang et al. | 338/25 |
| 6,787,870 B2 | * | 9/2004 | Wienand et al. | 257/467 |
| 6,973,837 B2 | * | 12/2005 | Barnett | 73/765 |

FOREIGN PATENT DOCUMENTS

JP      2000-241257      9/2000

* cited by examiner

*Primary Examiner*—Kyung Lee
(74) *Attorney, Agent, or Firm*—Kratz, Quintos & Hanson, LLP

(57) ABSTRACT

A film-like temperature sensor for more accurately measuring the temperatures at plural locations on the surface of a semiconductor wafer comprises a base film made of an insulating material; plural thin-film thermal elements for sensing temperature; plural thin-film leads, connected to the thermal elements; and plural thin-film terminals connected to the ends of the leads. The thermal elements, leads, and terminals are integrally formed either on the surface or in the thickness of the base film. The base film has a flat shape like a paddle, and comprises a head portion to be attached to the surface of a semiconductor wafer, and a strip-shaped tail portion extending outwardly of the semiconductor wafer. The plural thermal elements are arranged on the head portion in the form of either a concentric circle, spiral, matrix, or raster, and the plural terminals are arranged on the tail portion.

9 Claims, 10 Drawing Sheets

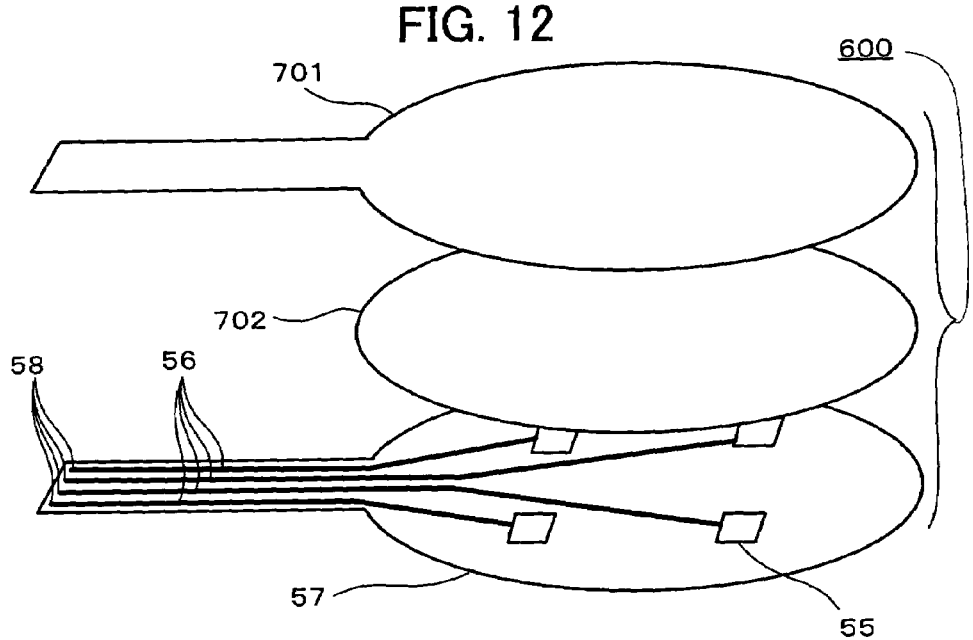
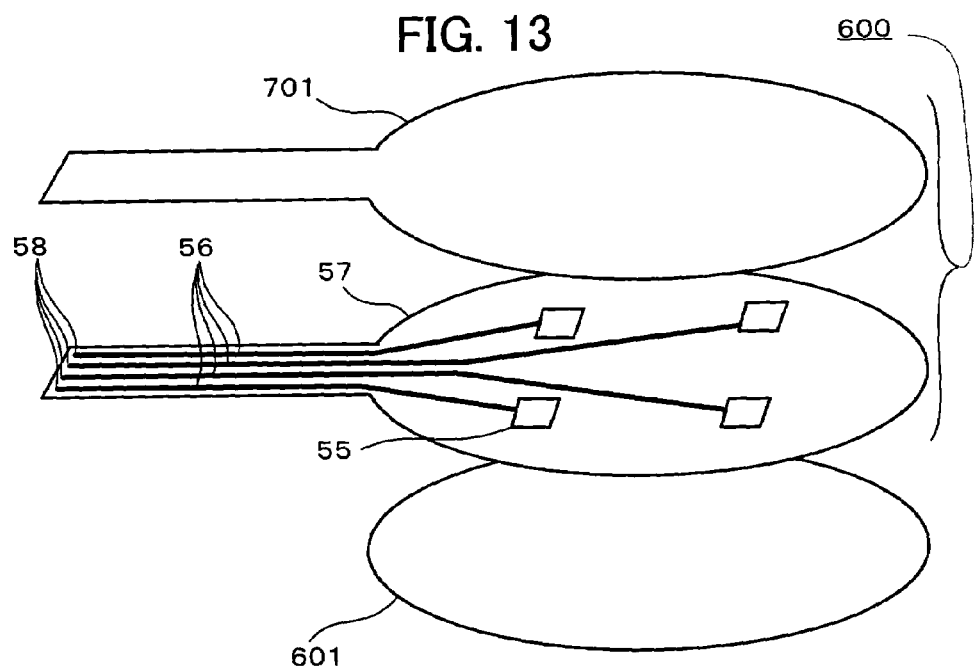

FILM TEMPERATURE SENSOR AND TEMPERATURE SENSING SUBSTRATE

CROSS-REFERENCE TO PRIOR APPLICATION

This application relates to and claims priority from Japanese Patent Application No. 2004-235505, filed on Aug. 12, 2004, the entire disclosure of which is incorporated herein by reference.

FIELD OF THE INVENTION

The present invention relates to a temperature sensor and temperature sensing substrate useful for measuring either the temperature of a semiconductor wafer or other such substrate, or the temperature of a temperature-controlling stage for heating and cooling such a substrate.

BACKGROUND OF THE INVENTION

For example, in the manufacturing process for a semiconductor product, a semiconductor wafer is placed on a temperature-controlling stage, which has heating and cooling capabilities, and processing, such as applying a coating of photoresist material to this semiconductor wafer, and subsequently subjecting it to etching, is carried out while adjusting the temperature of the semiconductor wafer using the temperature-controlling stage. In the preparatory phase prior to commencing the above-mentioned semiconductor manufacturing process, control parameters for the temperature-controlling stage must be set so as to uniformly control the temperature of a semiconductor wafer to the optimum level. In this setting process, a temperature-measuring semiconductor wafer on which temperature sensors are disposed in a plurality of locations (hereinafter, referred to as a temperature sensing substrate) is placed on the temperature-controlling stage, and the temperature-controlling stage is test operated using the given control parameters, heating and cooling operations are performed, the temperature of the temperature sensing substrate is measured at these times, and a determination is made as to whether or not a measured temperature is optimum. If these results are not optimum, the control method (for example, the various parameters, such as target temperature and control operations) are modified, and the above-mentioned test operation is performed once again using the modified control parameters.

When the temperature sensing substrate is placed on the temperature-controlling stage, and the temperature is measured like this, it is important that the temperature of the temperature sensing substrate be measured as accurately as possible. As conventional methods for measuring the temperature of the temperature sensing substrate, a method, whereby a temperature sensor is attached in contact with the top of the temperature sensing substrate and a signal is captured from the temperature sensor via a wire lead, and a method, whereby a resistor and a lead make close contact as a temperature sensor on top of the temperature sensing substrate and a signal is captured from the lead terminal, which is placed on the surface of this temperature sensing substrate via a wire lead, are disclosed in Japanese Laid-open Patent No. 2000-241257.

According to the methods disclosed in Japanese Laid-open Patent No. 2000-241257, the sensor and lead on top of the temperature sensing substrate can be patterned using screen printing. However, when printing is used to pattern the sensor and lead on top of the temperature sensing substrate, since the lead terminal is on the wafer, this results in the need to link the lead terminal on the temperature sensing substrate to a wire lead. Further, since there is a plurality of wire leads on top of the temperature sensing substrate, these wire leads disturb the temperature distribution and flow of air on the temperature sensing substrate, thereby affecting the temperature of the temperature sensing substrate. Further, because cleaning becomes difficult, the degree of cleanliness of the entire device deteriorates.

Also, there are instances when the temperature of the temperature-controlling stage should be measured, either during the above-mentioned setting process, or during the semiconductor manufacturing process for processing a semiconductor wafer. In this case, the temperature measurement capabilities of the above-mentioned conventional temperature sensor decline for the same reasons as cited hereinabove.

An object of the present invention is to enable the temperature at a plurality of locations on the broad surface of an object targeted for temperature measurement to be measured with greater accuracy.

Another object of the present invention is to enable the temperature of a substrate like a semiconductor wafer to be measured with greater accuracy.

SUMMARY OF THE INVENTION

A film temperature sensor according to a first aspect of the present invention comprises a base film made of an insulating material; a plurality of thin-film thermal elements integrally formed either on the surface or in the thickness of the base film; a plurality of thin-film leads which is integrally formed either on the surface of the base film or in the thickness thereof, and which is connected to the above-mentioned plurality of thermal elements; and a plurality of terminals which is integrally formed either on the surface or in the thickness of the base film, and which is connected to the above-mentioned plurality of leads.

The flat shape of the above-mentioned base film can be made in the shape of a paddle so as to comprise a head portion, which is utilized by coming in contact with, preferably, adhering to the surface of a target object, and a tail portion which extends outwardly from this head portion. In this case, the plurality of thermal elements can be arranged on the head portion, the plurality of terminals can be arranged on the tail portion, and then, the plurality of leads can be arranged on both the head portion and the tail portion so as to connect the thermal elements to the terminals. The plurality of thermal elements can be arrayed on the base film in the form of concentric circles, a spiral, a matrix or a raster.

A resistor pattern, which is formed from a zig-zag line of thin-film resistors possessing electrical resistance that changes in accordance with the temperature, can be employed in each of the above-mentioned plurality of thermal elements so as to cover a plurality of temperature measurement zones on the base film. A resistor pattern such as this can be formed on the base film using an etching, printing, sputtering or plating method. At the time this resistor pattern is formed, when R stands for a representative resistance value in the measurement temperature range of this resistor pattern, H stands for the dimension in the longitudinal direction of a temperature measurement zone, which this resistor pattern covers, T stands for the thickness of a resistance line thin-film, $\rho$ stands for the electrical resistivity of a conductive material, A stands for the width of this resistance line, k stands for the ratio of the width of the space between adjacent resistance lines relative to the resistance line width A, and C stands for an arbitrarily selected coefficient, the width A of this resistance line can be selected from the range of $$A^2 = C \cdot H^2 \cdot \rho/(1+k) \cdot T \cdot R$$

$$1 \geq C \geq \tfrac{2}{3}$$

The coefficient C can be selected in accordance with the shape of the temperature measurement zone covered by the resistor pattern (for example, a square, circular, rectangular or elliptical shape).

A film temperature sensor in accordance with the present invention can be used for the purpose of measuring temperatures in a semiconductor manufacturing process, and more particularly, for example, for the purpose of measuring the temperature distribution on the surface of a semiconductor wafer. In a film temperature sensor related to one embodiment for this purpose, this base film has the flat shape of a paddle. The head portion of this paddle-shaped base film is a circle, which is large enough to cover the entire area of the surface of either a semiconductor wafer or temperature-controlling stage, and is used in a state wherein it is either attached to the surface of a semiconductor wafer, attached to the surface of a temperature measurement stage, or sandwiched between a semiconductor wafer and a temperature measurement stage. A tail portion in the shape of a strip is integrally connected to the circular head portion of the base film, and this tail portion, when used, extends outwardly of either a semiconductor wafer or temperature-controlling stage, and can be connected to an external device.

A temperature sensing substrate in accordance with a second aspect of the present invention comprises a substrate which is the object targeted for temperature measurement, and a film temperature sensor which is mounted to the substrate. The film temperature sensor comprises a base film made of an insulating material; one or more thin-film thermal elements integrally formed either on the surface or in the thickness of the base film; one or more thin-film leads which are integrally formed either on the surface of the base film or in the thickness thereof, and which are connected to the above-mentioned one or more thermal elements; and one or more terminals which are integrally formed either on the surface or in the thickness of the base film, and which are connected to the above-mentioned one or more leads.

A temperature sensing substrate according to the present invention can be used for the purpose of measuring temperatures in a semiconductor manufacturing process, and more particularly, for example, for the purpose of determining the temperature distribution on the surface of a semiconductor wafer. A temperature sensing substrate related to one embodiment for this purpose comprises a semiconductor wafer as the substrate; and the above-mentioned film temperature sensor mounted to the surface of this semiconductor wafer.

Yet other objects and features of the present invention should become clear from the disclosure of the aspects of the embodiment described hereinbelow.

BRIEF DESCRIPTION OF THE DRAWINGS

FIG. 12 is an illustration showing a third embodiment of a film temperature sensor 600 manufacturing method;

FIG. 13 is an illustration showing a fourth embodiment of a film temperature sensor 600 manufacturing method;

DESCRIPTION OF THE PREFERRED EMBODIMENTS

A number of embodiments of the present invention will be explained below by referring to the figures.

Figure 1A:
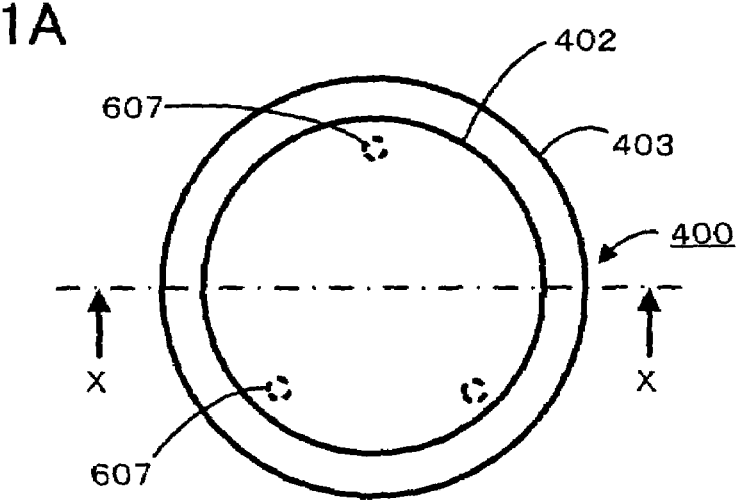
FIG. 1A is a plan view of a temperature-controlling stage.
Figure 1B:
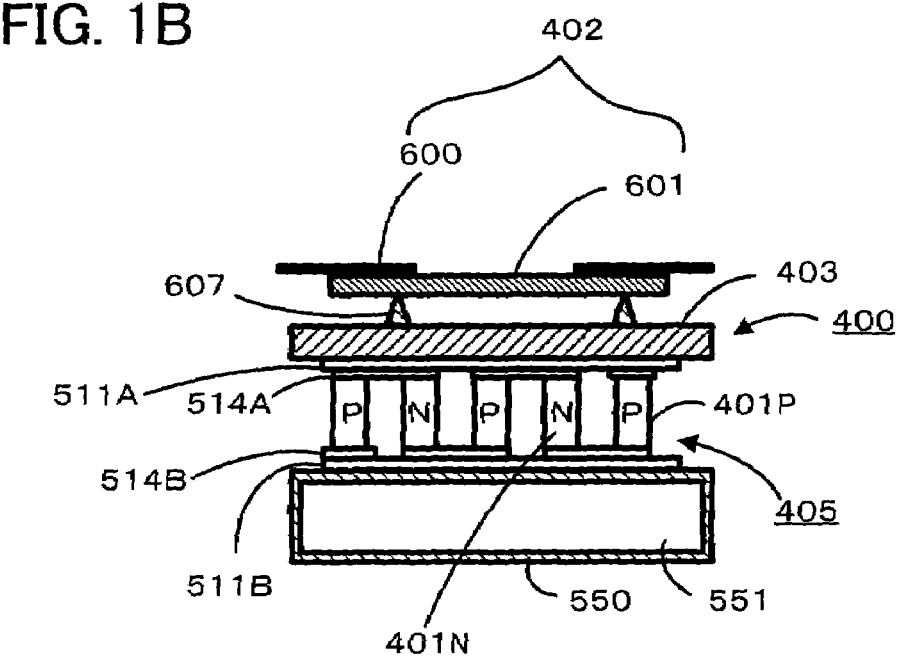
FIG. 1B is an X-X cross-sectional view of this temperature-controlling stage.

FIG. 1 shows an example of a temperature-controlling stage, which is used for controlling the temperature of a semiconductor wafer in a semiconductor manufacturing process. More specifically, FIG. 1A is a plan view of a temperature-controlling stage, and FIG. 1B is a cross-sectional view of this temperature-controlling stage at line X-X of FIG. 1A.

A temperature-controlling stage 400 comprises a mounting plate 403 for mounting a semiconductor wafer; a thermoelectric converter 405, which has a large number of thermoelectric conversion elements, and either heats or cools the mounting plate 403 and a heat exchange plate 550, which will be described below, using the Peltier effect; and a heat exchange plate 550 for carrying out the exchange of heat between the thermoelectric converter 405 and the outside.

The mounting plate 403 has a top face and a bottom face, and a plurality of protrusions (hereinafter, these will be called "support pins") 607, 607, . . . for mounting a semiconductor wafer are provided on the top face. In a semiconductor manufacturing process, a semiconductor wafer to be processed is mounted on top of these plurality of support pins 607, 607, . . . In the preparation phase for setting the control parameters of the temperature-controlling stage prior to commencing a semiconductor manufacturing process, a semiconductor wafer for use in measuring temperature (temperature sensing substrate) 402, on which one or more film temperature sensors 600 according to the present invention are attached, is mounted on top of the support pins 607, 607, . . .

A thermoelectric module 405 is provided on the bottom face of the mounting plate 403. The thermoelectric converter 405 has either one or a plurality of thermoelectric conversion modules (One thermoelectric conversion module is illustrated in FIG. 1B.). The respective thermoelectric modules are constituted having a plurality of thermoelectric conversion elements arrayed two-dimensionally, and a plurality of electrodes (514A, 514B), which constitute both sides of a heat exchange surface by connecting this plurality of thermoelectric conversion elements (401N, 401P) electrically, and these thermoelectric conversion elements and electrodes are sandwiched between two flat plates 511A, 511B. More specifically, pie-type units are formed, in which one p-type semiconductor element 401P and one n-type semiconductor element 401N are soldered to the respective top electrodes (for example copper plate or copper foil) 514A, which are provided on the bottom face of the thin flat plate on the top side (for example, a roughly 0.1 mm-thick adhesive sheet comprising either a ceramics or a polyimide resin) 511A, and, in addition, each pie-type unit of a p-type semiconductor element 401P, and pie-type unit of an n-type semiconductor element 401N adjacent thereto is soldered to the respective electrodes 514B of the bottom side, which are provided on the top face of the flat plate 511B of the bottom side. Thus, a plurality of p-type semi conductor elements 401P and a plurality of n-type semiconductor elements 401 N are connected in series electrically by electrodes on the top side and bottom side (514A, 514B). Then, when direct current is applied to the in-line connector of this p-type semiconductor element 401P and n-type semiconductor element 401N, depending on the direction of the electric current, heat is either absorbed by the top-side surface (top heat exchange surface) and radiated by the bottom side surface (bottom heat exchange surface) or it is absorbed by the bottom heat exchange surface and radiated by the top heat exchange surface.

The heat exchange plate 550 has a flow channel 551 for allowing a heat carrying fluid (for example, a coolant) to flow internally. This flow channel 551 can be a simple shape (for example, a rectangular parallelepiped space), or it can be a serpentine shape that substantially extends over the entire surface of the heat exchange plate 550. Furthermore, although not shown in the figure in particular, an air-cooled fin can be provided either on the bottom of this heat exchange plate 550, or in place of the heat exchange plate 550.

A temperature sensing substrate 402 according to a first embodiment of the present invention is constituted from a semiconductor wafer 601 for use in measuring temperature, having the same specifications as a to-be-processed semiconductor wafer used in a semiconductor manufacturing process; and one or more film-shaped temperature sensors (hereinafter, called a film temperature sensor) 600, which are respectively applied to one or more locations (ordinarily, several locations or more) where the temperature on the surface of this semiconductor wafer 601 should be measured.

The film temperature sensor 600, as will be explained below, comprises a base film made of a flexible insulating material; one or more thin-film thermal elements for measuring temperature; a plurality of terminals for outputting to the outside as electrical signals the temperature data detected by this thermal element; and a plurality of thin-film leads for transferring to the terminals the electrical signals from the thermal elements. Then, the thermal elements, terminals and leads are integrally formed either on the surface of the above-mentioned base film, or in the thickness thereof. The base film has a paddle-like flat shape, having a head portion, and a tail portion, which extends outwardly from this head portion. A thermal element is disposed in the head portion of this base film, and this head portion is attached so as to make close contact with the surface of a semiconductor wafer 601, which is the target of temperature measurement. Further, a terminal is disposed on the tail portion of the base film, and this tail portion extends outwardly from the semiconductor wafer 601. An external device (a device for applying a current to a film temperature sensor 600, and receiving an electrical signal indicating a temperature) is connected to the terminal of this tail portion.

Now then, a number of variations of the constitution of the above-mentioned thermal element is possible. A thermocouple, or device having a temperature-dependent resistance value, like a resistance temperature sensor, thermistor or other such thermal element or thermal device, the resistance value of which changes in accordance with the temperature, can be used as a temperature sensor. In the embodiment of the present invention, a resistance temperature sensor is used as an example.

Figure 2:
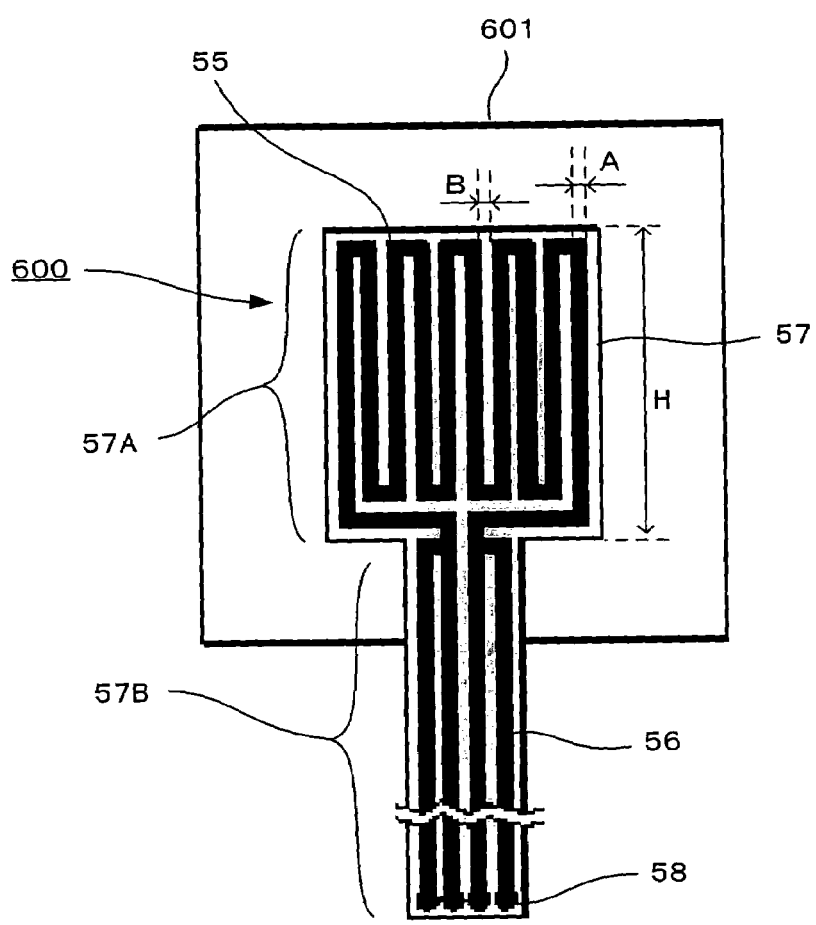
FIG. 2 is a plan view of a first embodiment of a film temperature sensor 600.

FIG. 2 shows a plan view of one embodiment of a film temperature sensor 600 of the present invention. In this film temperature sensor 600, as shown in FIG. 2, a resistor pattern 55, which serves as a thermal element, and a lead 56, which is connected thereto, are integrally formed either on the surface of a base film 57, which is made of, for example, a synthetic resin, in particular, for example, polyimide, or within the thickness thereof.

The resistor pattern 55 is a thin-film serpentine-like resistance line pattern made of a conductive material (for example, a metal such as copper), the electrical resistivity of which changes in accordance with the temperature, and covers a prescribed temperature measurement zone. When a fixed current is applied to the resistor pattern 55, the two-terminal voltage of the resistor pattern 55 will differ according to the temperature of the resistor pattern 55. Thus, the temperature of the semiconductor wafer 601 can be measured based on the results of measuring the two-terminal voltage of the resistor pattern 55.

The resistor pattern 55 can be formed using a method, which forms a prescribed conductive thin-film serpentine-like pattern of resistors on a base film 57 using either an etching, printing, sputtering or plating method. In this case, the width A of the resistance line constituting a resistor pattern 55 can be selected from within a range designated by the following formula:

$$A^2 = C \cdot H^2 \cdot \rho/(1+k) \cdot T \cdot R$$

$$1 \geq C \geq \tfrac{2}{3}$$

Here, R is a representative resistance value within the range of measured temperatures of the resistor pattern 55. H, as shown in FIG. 2, is the dimension in the longitudinal direction of the temperature measurement zone covered by the resistor pattern 55. k stands for the ratio of the width B of the space between adjacent resistance lines relative to the width A of the resistance line (in other words, B/A), and, ordinarily, k is around 1.0 (in other words, B is practically the same as A), and even when it is smaller than that, it is still about 0.5 or larger. $\rho$ is the electrical resistivity of the conductive material used in the resistor pattern 55. T is the thickness of the thin film of the resistance line. C is an arbitrarily selectable coefficient, and can be determined in accordance with the shape of the temperature measurement zone covered by the resistor pattern 55. For example, as shown in FIG. 2, when the shape of the temperature measurement zone (that is, the overall shape of the resistor pattern 55) is substantially square, C can be made to equal 1. When the shape of the temperature measurement zone is a shape other than a square, for example, a rectangle or circle, C can be made less than 1. For example, in the case of a circle, C can be approximately ¾, and when the shape is a long, thin rectangle or oval, C can be made to equal a value approaching ⅔.

Each lead 56 is a conductive line for applying current to the resistor pattern 55, and then outputting the two-terminal voltage of the resistor pattern 55 to an external device. This lead 56 is also formed, using the same method and at the same time as the resistor pattern 55, as a thin-film conductive line pattern with one end integrally linked to the resistor pattern 55. There are different kinds of wiring formats for a lead 56, such as a 2-lead format, a 3-lead format, and a 4-lead format, in accordance with the purpose, such as the size of the resistance value of the resistor pattern 55, or the resistance cancellation of a lead 56 itself, but in the embodiment of FIG. 2, the lead is a 4-lead format. A terminal 58 for electrically connecting to an external device not shown in the figure is disposed at the end of a lead 56. A terminal 58 is also formed, using the same method and at the same time as the resistor pattern 55 and lead 56, as a thin-film conductor strip pattern integrally linked to a thin-film line lead 56.

The base film 57 is flexible film, for example, a polyimide film, having a flat shape like a paddle as shown in FIG. 2, and has a head portion 57A and a tail portion 57B, which extends outwardly from this head portion 57A, on which the above-mentioned resistor pattern 55 is formed. The above-mentioned resistor pattern 55 is formed on the head portion 57A, and the above-mentioned terminal 58 is formed on the tail portion 57B. The lead 56 is formed on both the head portion 57A and the tail portion 57B, and connects the resistor pattern 55 on the head portion 57A to the terminal 58 on the tail portion 57B.

The head portion 57A of the base film 57 is attached by adhering it to the surface of the temperature measurement location of the semiconductor wafer 601. Further, the tail portion 57B of the base film 57 extends outwardly of the semiconductor wafer 601, and a terminal 58 is arranged at the tip thereof.

In the past, when measuring the temperature of a semiconductor wafer, a plurality of tubular-shaped well-like holes were made at a plurality of locations on the surface of the semiconductor wafer, and a temperature sensor was attached in contact with and affixed inside each hole. In addition, a wire lead was mounted in the vicinity of a hole, and the two-terminal voltage of the resistor pattern 55 was outputted to the outside from the mounted wire lead. Thus, the existence of the wire lead caused slight changes in the flow of air over the substrate, consequently causing minute temperature changes and making it impossible to measure the precise temperature. And since the wire lead was affixed onto the substrate using solder or the like, the lead was apt to break, so that conventional temperature measurement semiconductor wafers like this were not very handy.

Further, even when the temperature sensor disclosed in Japanese Laid-open Patent No.2000-241257 was used, it was still necessary to connect a wire lead to the terminal portion on the semiconductor wafer, resulting in the same problem as mentioned above.

By contrast, when a resistor pattern 55, lead 56 and terminal 58 are integrally formed in the base film 57 as in this embodiment, the part where the resistor pattern 55 and lead 56 connect is highly durable. Further, because the lead 56, which extends outwardly from the semiconductor wafer 601, is integrated into the base film 57 adhering to the surface of the semiconductor wafer 601, there is less danger that it will disturb the flow of air over the semiconductor wafer 601. Accordingly, this film temperature sensor 600 makes it possible to accurately measure the temperature of the surface of the semiconductor wafer 601. In addition, since this film temperature sensor 600 is a flexible film capable of bending easily, it can be attached not only to a flat surface, but to a curved surface as well. Accordingly, this film temperature sensor 600 can be utilized not only on a semiconductor wafer, but also to measure the temperature of the curved surface of other objects.

Figure 3:
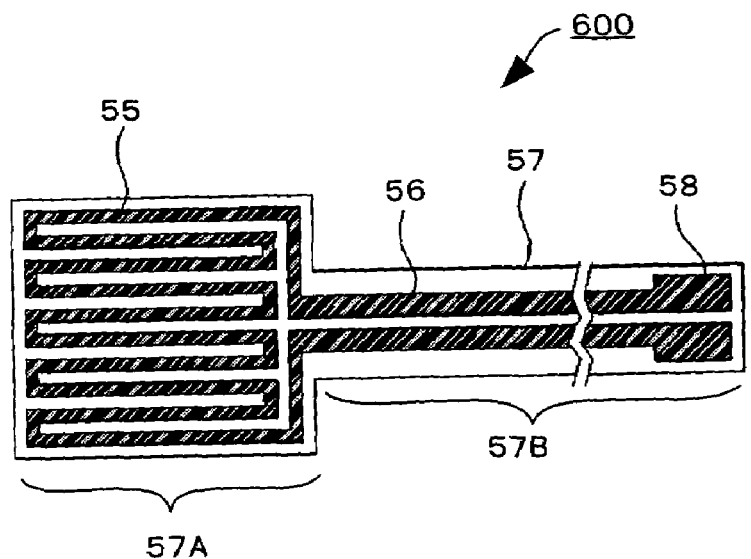
FIG. 3 is a plan view of another embodiment of a film temperature sensor 600.

FIG. 3 is a plan view showing another embodiment of a film temperature sensor 600 of the present invention.

The lead 56 is a two-lead type, and is constituted from a two-line pattern as shown in FIG. 3. The lead 56 is mounted by being integrally formed either on top of or inside the base film 57 the same as the resistor pattern 55. The constitutions of the other parts are the same as the film temperature sensor 600 disclosed in FIG. 2.

Figure 4:
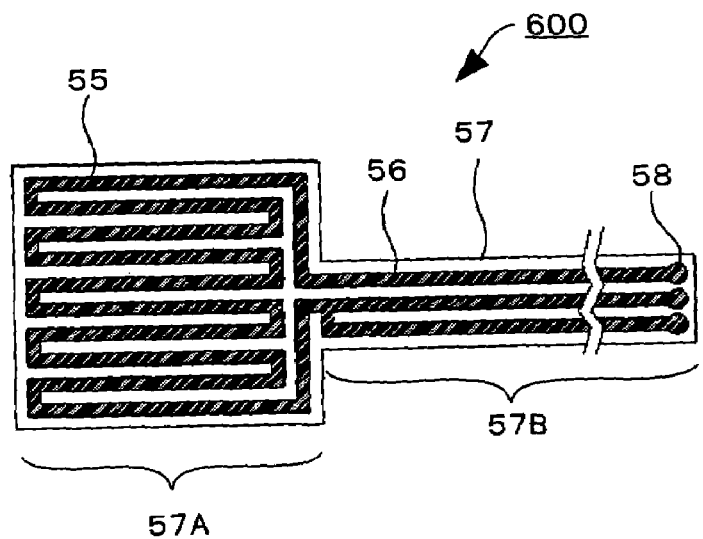
FIG. 4 is a plan view of yet another embodiment of a film temperature sensor 600.

FIG. 4 is a plan view showing yet another embodiment of a film temperature sensor 600 of the present invention.

The lead 56 is a three-lead type, and is constituted from a three-line pattern as shown in FIG. 4. The constitutions of the other parts are the same as the film temperature sensor 600 disclosed in FIG. 2.

The film temperature sensors 600 shown in FIG. 2 through FIG. 4 have a single thermal element, and are respectively applied to a plurality of locations where the temperature is to be measured on the semiconductor wafer 601. By contrast, the film temperature sensors 600 shown in FIG. 5 through FIG. 8 below have a plurality of thermal elements, and it is possible to simultaneously measure the temperature at different locations on the surface of the semiconductor wafer 601 using one of these film temperature sensors 600.

Figure 5:
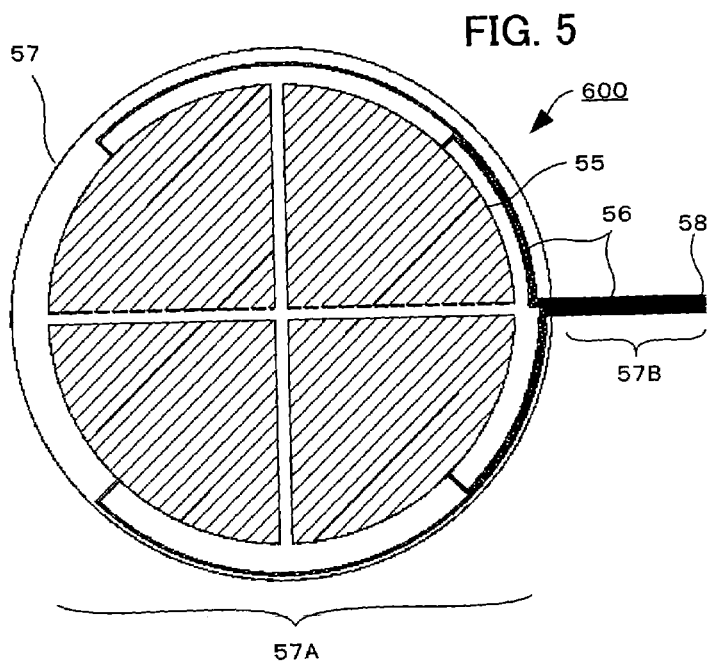
FIG. 5 is a plan view of yet another embodiment of a film temperature sensor 600.

FIG. 5 shows one embodiment of such a film temperature sensor 600.

The base film 57 has a flat shape like a paddle, and has a circular head portion 57A capable of being attached so as to adhere to the entire surface of the semiconductor wafer 601. A plurality of sector-shaped temperature measurement zones arranged in a matrix are disposed inside the region of the entire head portion 57A of the base film 57, and each of a plurality of sector-shaped thermal elements 55, 55, . . . is formed either on the surface of the head portion 57A or in the thickness thereof so as to cover these plurality of temperature measurement zones, respectively. The base film 57 also has a long, strip-shaped tail portion 57B, which extends outwardly from the above-mentioned circular head portion 57A. Then, a plurality of leads 56, 56, . . . , which is integrally linked to the above-mentioned plurality of resistor patterns 55, 55, . . . , respectively, is formed either on the surface of both the head portion 57A and tail portion 57B, or in the thickness thereof. In addition, a plurality of terminals 58, 58, . . . , which is integrally linked to the above-mentioned plurality of leads 56, 56, . . . , respectively, is formed either on the surface of the tail portion 57B, or in the thickness thereof. The respective thermal elements 55, terminals 58, and leads 56 are patterns of either thin-film resistors or conductors as was explained by referring to FIG. 2, and as methods for forming these, as mentioned above, various methods, such as pasting, printing, and so forth can be employed. The plurality of resistor patterns 55 measures the temperature of the respective sector-shaped zones, and the temperature distribution of the entire surface of the semiconductor wafer 601 is determined from these temperature measurement values.

Furthermore, the number of resistor patterns 55 is not limited to four as shown in the figure, but rather can be either more or less than this. Further, the shape of a resistor pattern 55 can be other shapes besides the sector shape shown in FIG. 5. Further, there can also be a separate base film 57 for each resistor pattern 55.

Figure 6:
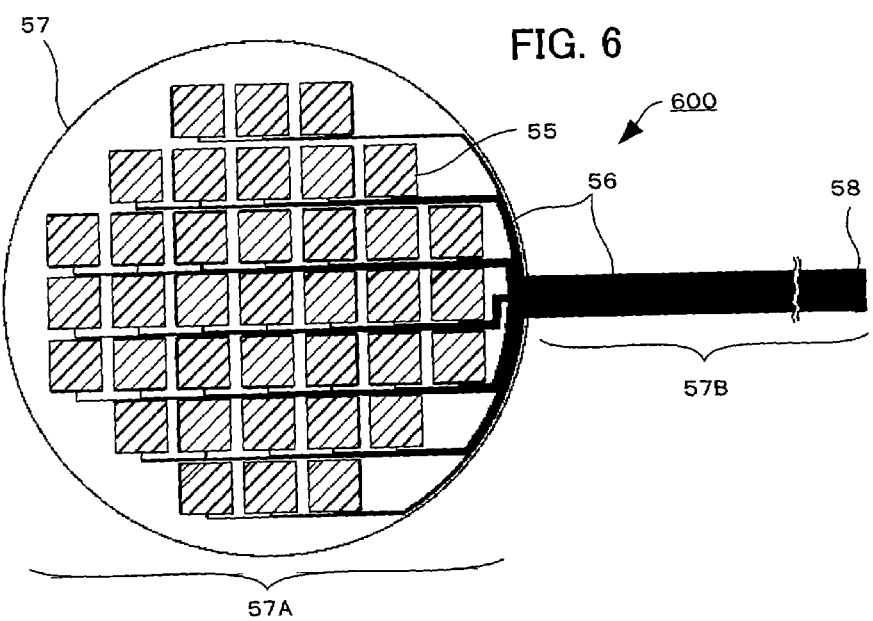
FIG. 6 is a plan view of yet another embodiment of a film temperature sensor 600.

FIG. 6 shows a plan view of yet another embodiment of a film temperature sensor 600 of the present invention.

As shown in FIG. 6, the base film 57 has a circular head portion 57A, which is attached so as to adhere to the entire surface of the semiconductor wafer 601, and a strip-shaped tail portion 57B, which extends outwardly from the head portion 57A. A large number of rectangular temperature measurement zones arranged in the form of either a matrix or a raster are disposed inside the entire region of the head portion 57A, and a large number of thermal elements 55, 55, . . . are formed either on the surface of the head portion 57A or in the thickness thereof so as to cover these large number of temperature measurement zones, respectively. A plurality of terminals 58, 58, . . . is formed in the tail portion 57B of the base film 57, and, in addition, a plurality of leads 56, 56, . . . , which connect the thermal elements 55, 55, . . . to the terminals 58, 58, . . . , is formed on both the head portion 57A and tail portion 57B. The respective thermal elements 55, terminals 58, and leads 56 are patterns of either thin-film resistors or conductors, as was explained by referring to FIG. 2. The respective resistor patterns 55 can be provided on all of the plurality of rectangular zones, or they can only be provided on either one, or two or more arbitrarily selected zones. The leads 56 are formed integrally linked to the resistor patterns 55, and are formed either on the surface or in the thickness of the strip-shaped tail portion 57B, which extends from the head portion 57A of the base film 57.

Figure 7:
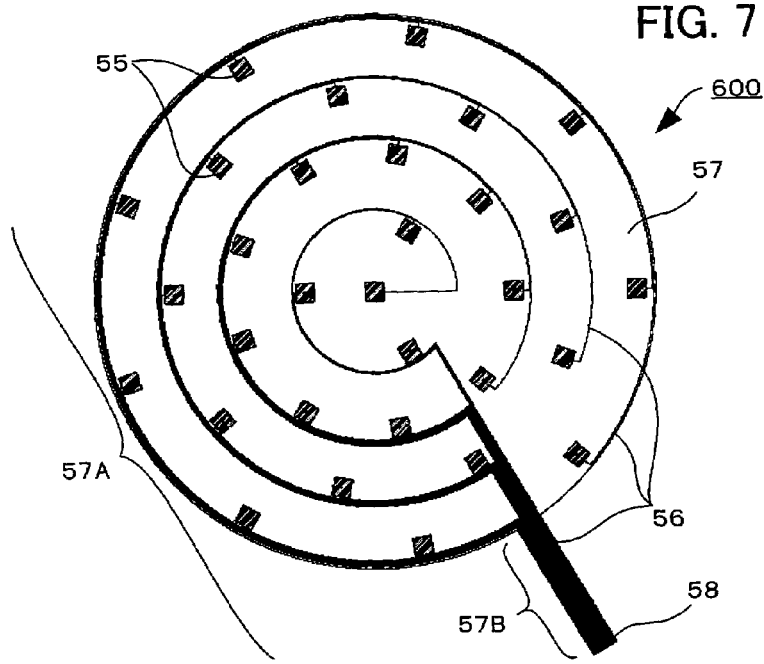
FIG. 7 is a plan view of yet another embodiment of a film temperature sensor 600.

FIG. 7 shows a plan view of yet another embodiment of the present invention.

As shown in FIG. 7, a plurality of rectangular temperature measurement zones, which is arrayed in the form of concentric circles, is provided inside the entire region of the circular head portion 57A of the base film 57, and thermal elements 55, 55, . . . are formed either on the surface of the head portion 57A or in the thickness thereof so as to cover these temperature measurement zones, respectively. Further, a plurality of terminals 58, 58, . . . is formed on the tail portion 57B of the base film 57, and, in addition, a plurality of leads 56, 56 . . . connecting the thermal elements 55, 55, . . . and terminals 58, 58, . . . is formed on both the head portion 57A and the tail portion 57B. The respective thermal elements 55, terminals 58, and leads 56 are patterns of either thin-film resistors or conductors, as was explained by referring to FIG. 2. Furthermore, the variation of the circular array of resistor patterns 55, 55, . . . is not limited to a concentric circle as shown in FIG. 7, but rather spiral arrays or other form of arrays are also possible. The plurality of leads 56, 56, . . . extend along a plurality of concentric circles on the head portion 57A of the base film 57, converge at the tail portion 57B of the base film 57, and extend outwardly along the tail portion 57B.

Figure 8:
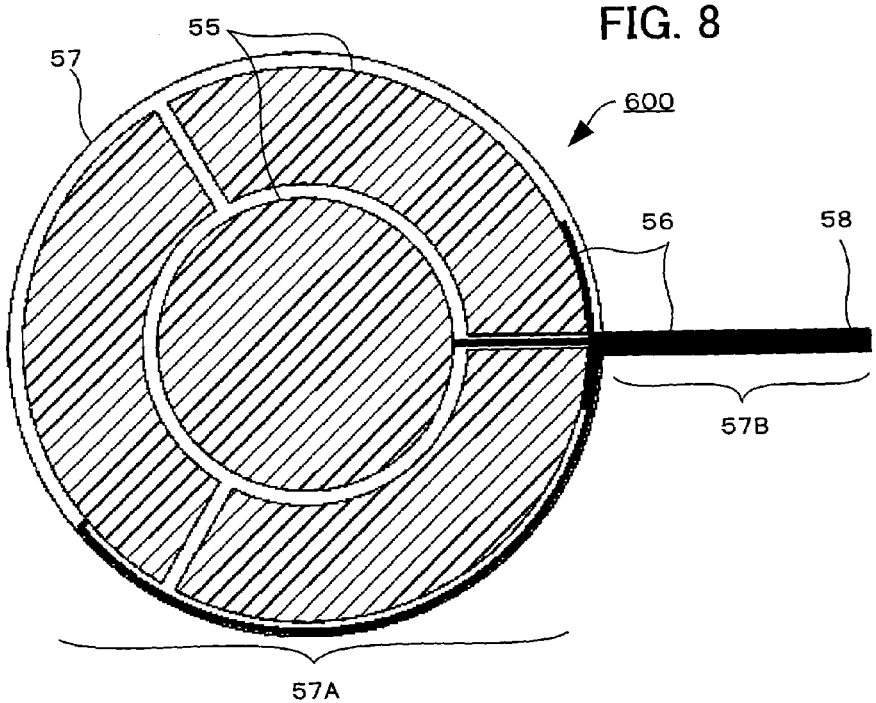
FIG. 8 is a plan view of yet another embodiment of a film temperature sensor 600.

FIG. 8 shows a plan view of yet another embodiment of the present invention.

As shown in FIG. 8, a central circular temperature measurement zone and three circular arc-shaped temperature measurement zones peripheral thereto are provided inside the entire region of the circular head portion 57A of the base film 57, and thermal elements 55, 55, . . . are formed either on the surface of the head portion 57A or in the thickness thereof so as to cover this plurality of temperature measurement zones arrayed in concentric circles. Further, a plurality of terminals 58, 58, . . . is formed in the tail portion 57B of the base film 57, and, in addition, a plurality of leads 56, 56, . . . connecting the thermal elements 55, 55, . . . and terminals 58, 58, . . . is formed on both the head portion 57A and tail portion 57B. The respective thermal elements 55, terminals 58, and leads 56 are patterns of either thin-film resistors or conductors, as was explained by referring to FIG. 2. Furthermore, the example of FIG. 8 comprises one circular zone in the center of the base film 57, and three circular arc-shaped temperature measurement zones, which constitute one part of a concentric circle layer, but the present invention is not limited to this, and the shape, number, and array of the temperature measurement zones can be arranged in accordance with the processing objective or the like. Further, the configuration and resistance value of the resistor pattern 55 provided on each temperature measurement zone can be arranged in accordance with the processing objective or the like.

Figure 9:
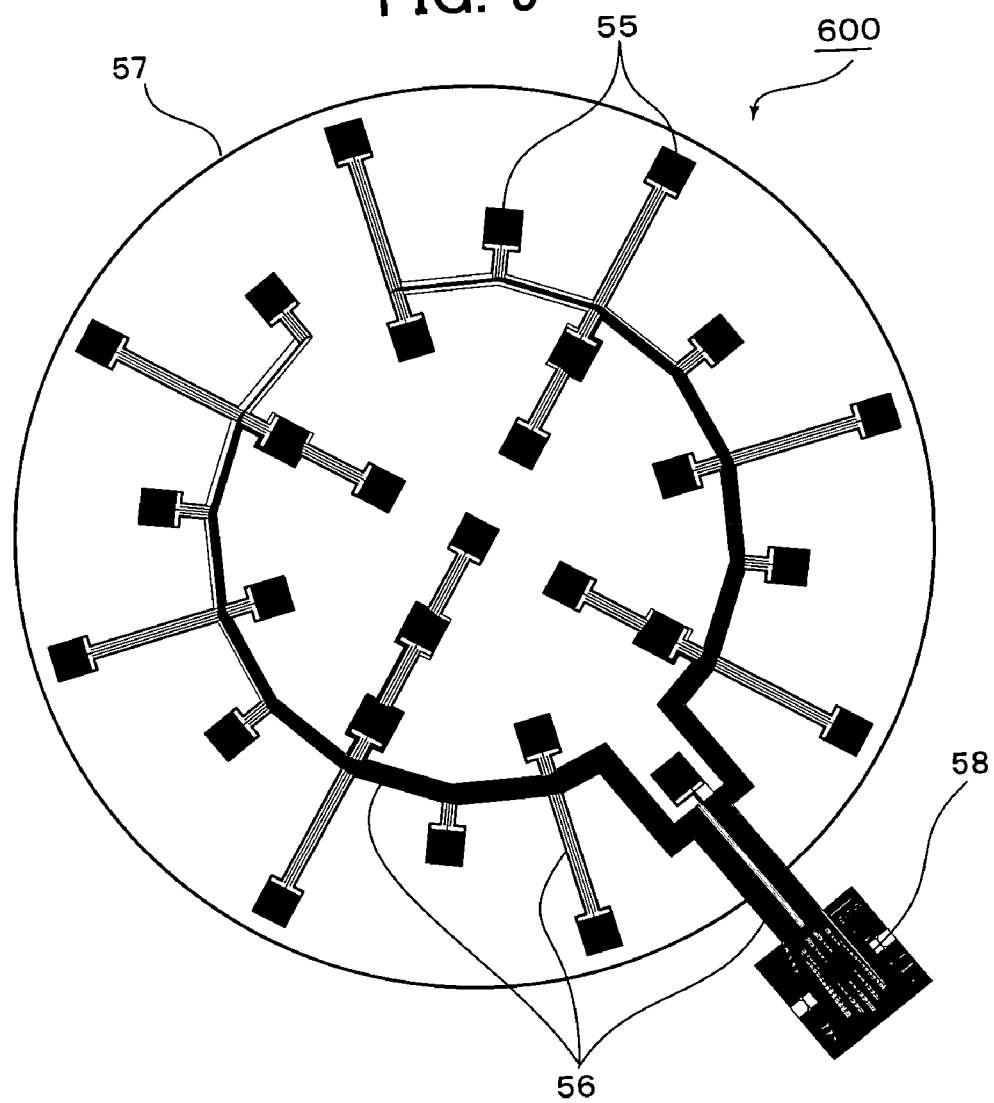
FIG. 9 is a plan view of yet another embodiment of a film temperature sensor 600.

FIG. 9 shows a plan view of yet another embodiment of the present invention.

As shown in FIG. 9, a plurality of rectangular temperature measurement zones, which is arrayed in concentric circles, is provided inside the entire region of the circular head portion 57A of the base film 57, and thermal elements 55, 55, . . . are formed either on the surface of the head portion 57A or in the thickness thereof so as to cover these temperature measurement zones, respectively. Further, a plurality of terminals 58, 58, . . . is formed on the tail portion 57B of the base film 57, and, in addition, a plurality of leads 56, 56 . . . connecting the thermal elements 55, 55, . . . and terminals 58, 58, . . . is formed on both the head portion 57A and the tail portion 57B. The respective thermal elements 55, terminals 58, and leads 56 are patterns of either thin-film resistors or conductors, as was explained by referring to FIG. 2. The plurality of leads 56, 56, . . . extends along a plurality of radial lines, which pass through the resistor patterns 55, 55, . . . on the head portion 57A of the base film 57, and converge on one circumference, and extend along this one circumference and converge at the tail portion 58B of the base film 57, extending outwardly along the tail portion 58B. Furthermore, as a variation, the shape of the base film 57 is not a paddle shape, but rather can either be the same flat shape of the region corresponding to the resistor patterns 55, 55, . . . , leads 56, 56, . . . , and terminals 58, 58, . . . , or can be made into a shape which expands the flat shape of this region outwardly by a slight margin.

Next, a manufacturing method for the film temperature sensor 600 introduced above will be explained.

An overview of a manufacturing method is as follows. First, a film made of an insulating material, for example, a polyimide film, on the surface of which is formed a thin film of metal (for example, Ni, Cu, Pt, or the like) using a bonding, sputtering, printing, or plating method, is prepared. Next, pattern etching is performed relative to the metal foil on the surface of this polyimide film to form a resistor pattern 55 and lead 56. The pattern etching process flow is carried out in the following order: (1) resist processing (either a photosensitive resin coating or a dry film laminate), (2) exposure (prints the conductor pattern), (3) developing (removes of unnecessary photosensitive resin), (4) etching (dissolves and removes unnecessary copper foil), and (5) stripping (removes etching resist). Pattern etching produces a film sensor, comprising a metallic thin-film resister pattern and lead integrally formed at the same time on the polyimide film.

A number of embodiments of the above-mentioned manufacturing method will be explained hereinbelow by referring to FIG. 10 and beyond.

Figure 10:
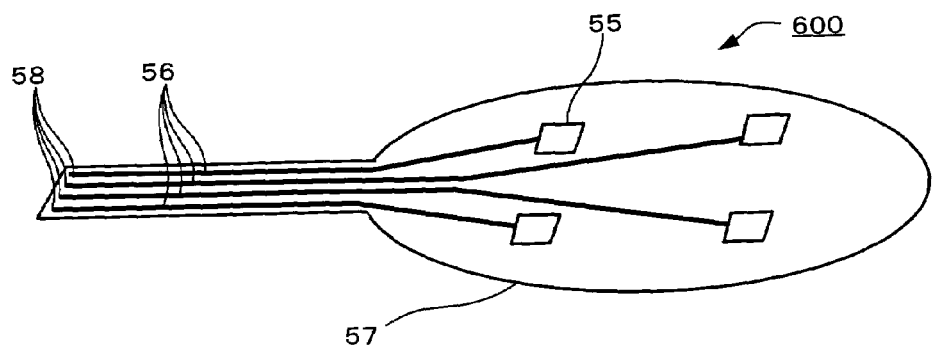
FIG. 10 is an illustration showing a first embodiment of a film temperature sensor 600 manufacturing method.

FIG. 10 is an illustration showing a first embodiment of a manufacturing method for a film temperature sensor 600.

As shown in FIG. 10, on a single paddle-shaped base film 57 comprising a circular head portion 57A and a strip-shaped tail portion 57B extending therefrom, a resistor pattern (thermal element) 55, lead 56, and terminal 58 are integrally formed using pattern etching. The base film 57, for example, is a polyimide film, and either a film having a denatured layer, such as a denatured polyimide, or one that does not have a denatured layer can be used. Then, on the surface of the side of the base film 57 on which the resistor pattern 55 and lead 56 are formed, processing for protecting the resistor pattern 55 and lead 56 is carried out using either a chemical rust-proofing process, or a resin coating resulting from either a plating or electrodeposition method.

Figure 11:
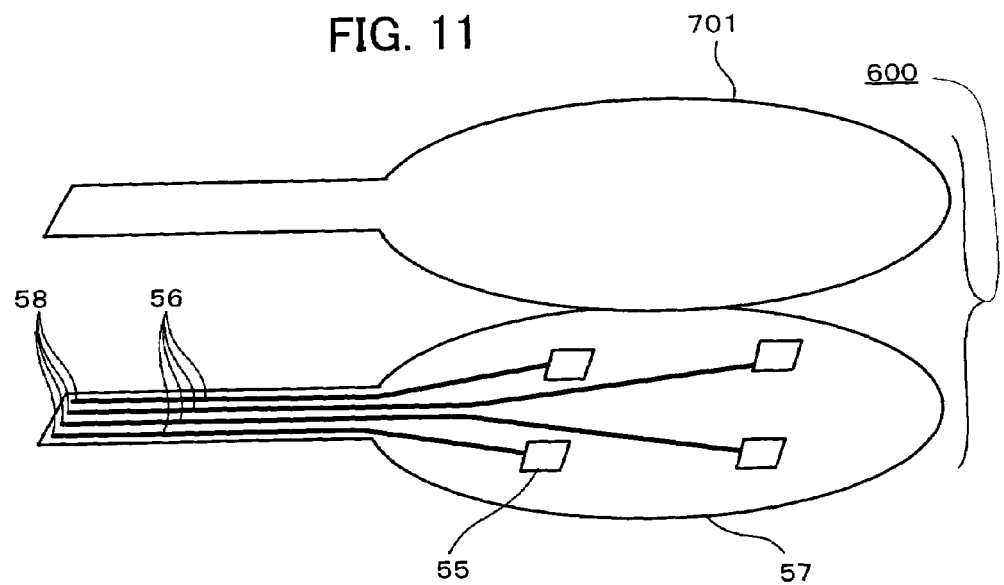
FIG. 11 is an illustration showing a second embodiment of a film temperature sensor 600 manufacturing method.

FIG. 11 is an illustration showing a second embodiment of a manufacturing method for a film temperature sensor 600.

As shown in FIG. 11, after the method shown in FIG. 10 has been carried out, in addition, a cover lay 701 of the same paddle shape as the base film 57 is laminated onto the surface of the side of the base film 57 on which the resistor pattern 55 and lead 56 are formed.

The cover lay 701 has the function of insulating, rust-proofing and mechanically protecting the resistor pattern 55 and lead 56. As the cover lay 701 material, a film-like resin having an adhesive or an adhesive layer, a liquid resin, such as polyimide or varnish, solder resist, a photosensitive resin, or plating can be used. When a film-like resin is used as the cover lay 701, both a denatured layer like a denatured polyimide, and an adhesive layer like a polyimide, polyethylene, or PET can be used. Then, methods for mounting a cover lay 701 using these materials include heat processing, printing, electrodeposition, and coating.

FIG. 12 is an illustration showing a third embodiment of a manufacturing method for a film temperature sensor 600.

As shown in FIG. 12, when the cover lay 701 is laminated to the base film 57 using the method shown in FIG. 11, an adhesive sheet 702 is sandwiched between the two, and these three are laminated together.

A resin-based adhesive sheet and an adhesive can be used in the adhesive sheet 702, examples of this type of sheet being a polyimide-, epoxy-, silicon-, or acrylic-based sheet. These three are then laminated in the order of base film 57, adhesive sheet 702, and cover lay 701, and subjected to heat and pressure treatments to produce s film temperature sensor 600. Furthermore, the adhesive sheet 702 does not necessarily have to be in the form of a sheet, but rather can be replaced by a liquid that is coated onto the adhesive object.

FIG. 13 is an illustration showing a fourth embodiment of a manufacturing method for a film temperature sensor 600.

As shown in FIG. 13, a film temperature sensor 600 is fabricated on the surface of a semiconductor wafer 601 using the method shown in FIG. 11. That is, a semiconductor wafer 601, base film 57, and cover lay 701 are laminated to one another in that order, and subjected to heat and pressure treatment to produce a temperature sensing substrate 402. In this case, a synthetic resin film having a denatured layer is used in the base film 57 and cover lay 701, and the bonding of the semiconductor wafer 601, base film 57 and cover lay 701 is carried out using the fusability of this denatured layer.

Figure 14:
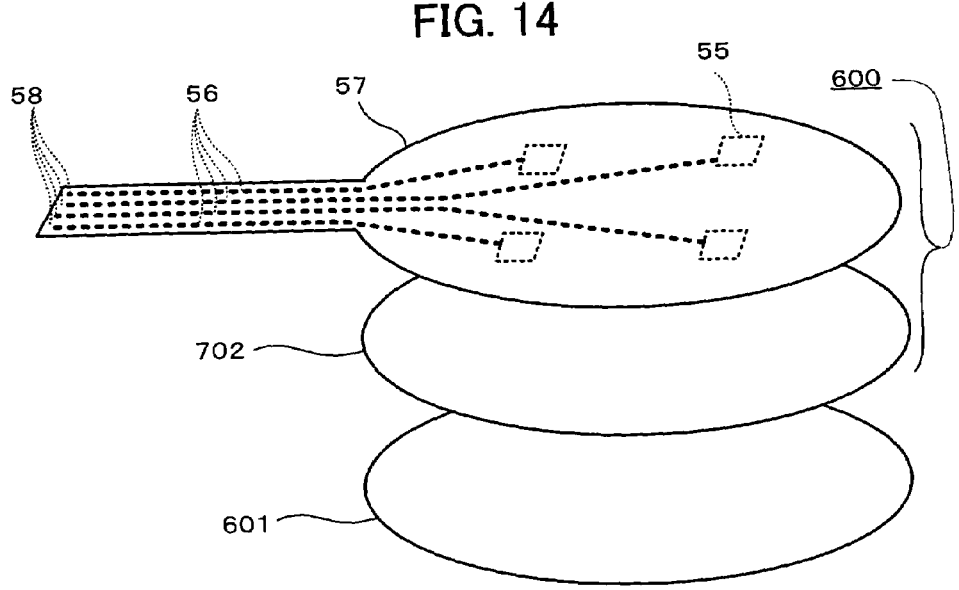
FIG. 14 is an illustration showing a fifth embodiment of a film temperature sensor 600 manufacturing method.

FIG. 14 is an illustration showing a fifth embodiment of a manufacturing method for a film temperature sensor 600.

As shown in FIG. 14, a temperature sensing substrate 402 is fabricated by laminating a semiconductor wafer 601, adhesive sheet 702, and base film 57, in that order, and subjecting them to heat and pressure treatment. The resistor pattern 55, lead 56 and terminal 58 are formed on the underside of the base film 57 (the surface of the adhesive sheet 702 side). The adhesive sheet 702 also serves as an electrical insulation layer. The base film 57 also functions as a cover lay 701.

Figure 15:
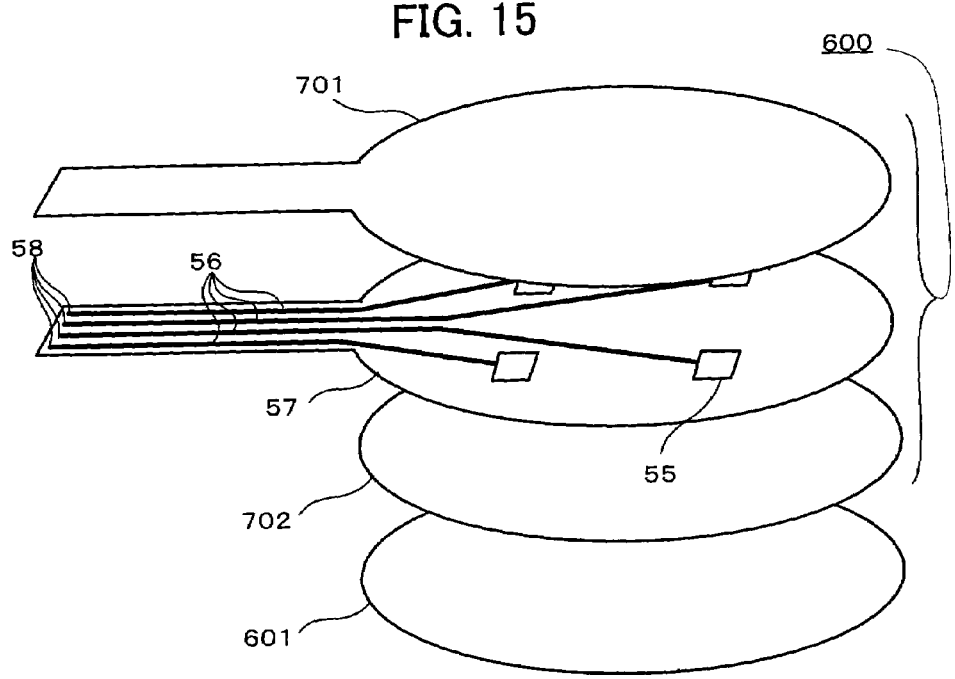
FIG. 15 is an illustration showing a sixth embodiment of a film temperature sensor 600 manufacturing method.

FIG. 15 is an illustration showing a sixth embodiment of a manufacturing method for a film temperature sensor 600.

As shown in FIG. 15, a temperature sensing substrate is fabricated by laminating a semiconductor wafer 601, adhesive sheet 702, base film 57, and cover lay 701, in that order, and subjecting them to heat and pressure treatment.

Figure 16:
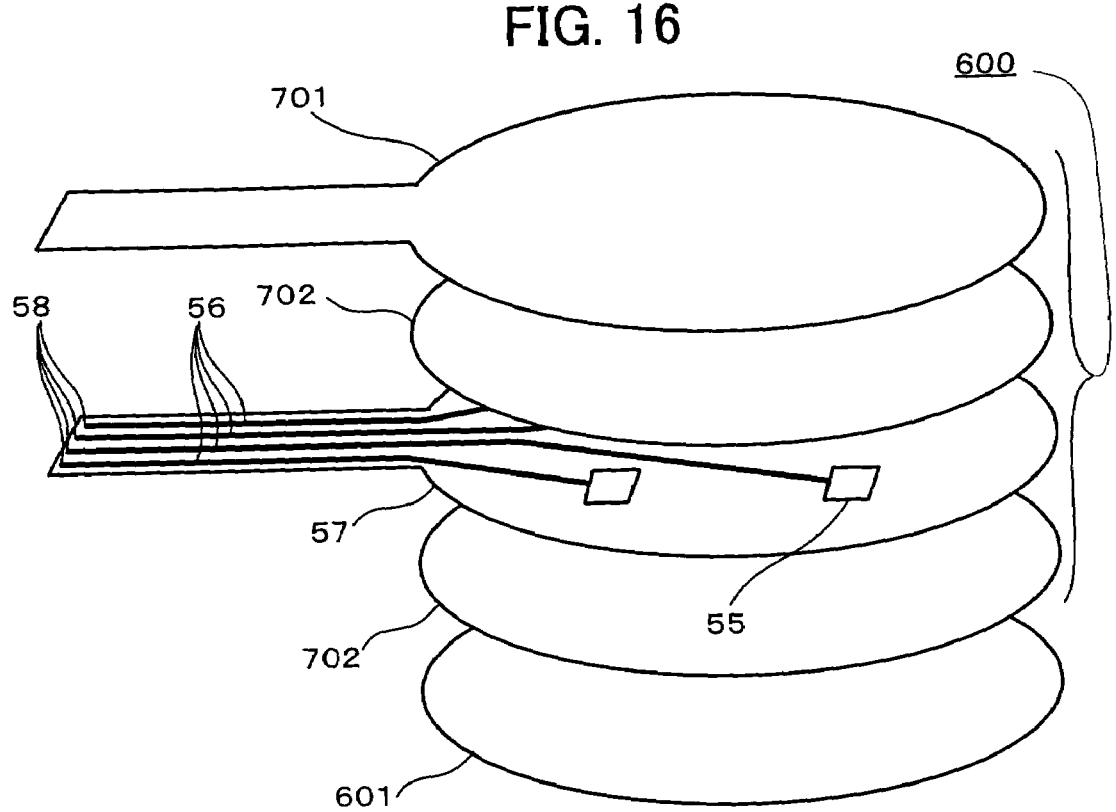
FIG. 16 is an illustration showing a seventh embodiment of a film temperature sensor 600 manufacturing method.

FIG. 16 is an illustration showing a seventh embodiment of a manufacturing method for a film temperature sensor 600.

As shown in FIG. 16, a temperature sensing substrate is fabricated by laminating a semiconductor wafer 601, adhesive sheet 702, base film 57, adhesive sheet 702, and cover lay 701, in that order, and subjecting them to heat and pressure treatment.

The preferred embodiments of the present invention have been explained hereinabove, but these embodiments are examples for explaining the present invention, and do not purport to limit the scope of the present invention to these embodiments alone. The present invention can be implemented in a variety of other aspects without deviating from the gist thereof.

As a method for integrally forming a conductive layer, such as a resistor pattern 55 and lead 56, in a resin film, it is possible to use (1) a sputtered layer+etching, (2) a copper-plated layer+pattern etching, (3) patterned copper plating, or (4) screen printing.

Further, two or more thermal elements can be laminated in the same location to function as a heat flux. For example, fabricating a resistor pattern (resistors) in the same location on the top and bottom of a flexible substrate to which metal foil has been bonded to both sides, and making this function as a temperature sensor, enables the heat flux passing through this location to be measured from the temperature difference data of the top and bottom.

A film temperature sensor of the present invention can also be used to measure the temperature of a temperature-controlling stage by affixing it to the temperature-controlling stage. Further, by arranging a film temperature sensor of the present invention on top of a temperature-controlling stage, it can also be utilized to measure the temperature of a semiconductor sensor placed on top thereof. By interposing a film temperature sensor of the present invention between a semiconductor wafer and a temperature-controlling stage in a production semiconductor manufacturing process for forming a semiconductor circuit on top of a semiconductor wafer, rather than in a test semiconductor manufacturing process for measuring temperature, it is possible to measure the temperature of a semiconductor wafer, which is undergoing actual processing in a production semiconductor manufacturing process (in-situ temperature measurement).

What is claimed is:

1. A film temperature sensor comprising:
a base film made of an insulating material;
a plurality of thin-film thermal elements integrally formed either on a surface or in a thickness of said base film;
a plurality of thin-film leads integrally formed either on the surface of said base film or in the thickness thereof, and connected to said plurality of thermal elements; and
a plurality of terminals integrally formed either on the surface or in the thickness of said base film, and connected to said plurality of leads,
wherein each of said plurality of thermal elements is a resistor pattern of a serpentine thin-film resistor line covering each of a plurality of temperature measurement zones on said base film, and having electrical resistivity that changes in accordance with a temperature; and
when R stands for a representative resistance value within a range of measurement temperatures of said resistor pattern, H stands for a dimension in a longitudinal direction of said temperature measurement zone, T stands for a thickness of the thin film of said resistor line, $\rho$ stands for a electrical resistivity of said conductive material, A stands for a width of said resistor line, and k stands for a ratio of a width of a space between adjacent resistor lines relative to the width A of said resistor line, the width A of said resistor line of said resistor pattern is selected from within the range of:

$$(2/3)(H^2\rho/(1/k) \cdot T \cdot R) \leq A^2 = (H^2\rho/(1/k) \cdot T \cdot R).$$

2. The film temperature sensor according to claim 1, wherein said base film has a flat shape like a paddle, and comprises a head portion for making contact with a surface of an object targeted for temperature measurement, and a tail portion extending outwardly from said head portion; and
said plurality of thermal elements are arranged on said head portion, said plurality of terminals are arranged on said tail portion, and said plurality of leads are arranged on both said head portion and said tail portion.

3. A method for manufacturing a temperature sensing substrate, comprising the steps of:
laminating in the order of a substrate made of semiconductor wafer, an adhesive sheet, and a head portion of a film temperature sensor, and
subjecting to heat and pressure treatments to bond said substrate and said head portion of said film temperature sensor, wherein
said film temperature sensor comprises:
a base film made of an insulating material, which has a flat shape like a paddle, and comprises the head portion and a tail portion extending outwardly from said head portion;
a plurality of thermal elements either on a surface of said base film or in a thickness thereof;
a plurality of leads which are connected to said plurality of thermal elements; and
a plurality of terminals which are connected to said plurality of leads, wherein
said plurality of terminal elements are ranged on said head portion, said plurality of terminals are arranged on said tail portion, and said plurality of leads are arranged on both said head portion and said tail portion.

4. The manufacturing method for a film temperature sensor according to claim 3, wherein, when R stands for a representative resistance value within a range of measurement temperatures of said resistor pattern, H stands for a dimension in a longitudinal direction of said temperature measurement zone, T stands for a thickness of the thin film of said resistor line, ρ stands for a electrical resistivity of said conductive material, A stands for a width of said resistor line, and k stands for a ratio of a width of a space between adjacent resistor lines relative to the width A of said resistor line, and C stands for an arbitrarily selected coefficient, the width A of said resistor line of said resistor pattern is selected from within the range of:

$$A^2 = C \cdot H^2 \cdot \rho/(1/k) \cdot T \cdot R$$

$$1 \geq C \geq 2/3.$$

5. The method according to claim 3, wherein said base film is flexible.

6. A temperature sensing substrate which is manufactured by the following steps:
laminating in the order of a substrate made of semiconductor wafer, an adhesive sheet, and a head portion of a film temperature sensor; and
subjecting to heat and pressure treatments to bond said substrate and said head portion of said film temperature sensor, wherein
said film temperature sensor comprises:
a base film made of insulating material, which has a flat shape like a paddle, and comprises the head portion and a tail portion extending outwardly from said head portion;
a plurality of thermal elements either on a surface of said base film or in a thickness thereof,
a plurality of leads which are connected to said plurality of thermal elements, and
a plurality of terminals which are connected to said plurality of leads, wherein
said plurality of thermal elements are arranged on said head portion, said plurality of terminals are arranged on said tail portion, and said plurality of leads are arranged on both said head portion and said tail portion.

7. The film temperature sensor according to claim 6, wherein said plurality of thermal elements are arranged in a form of either a concentric circle or a spiral.

8. The film temperature sensor according to claim 6, wherein said plurality of thermal elements are arranged in a form of either a matrix or a raster.

9. The temperature sensing substrate according to claim 6, wherein said base film is flexible.

* * * * *